(12) United States Patent
Yamamoto

(10) Patent No.: US 7,265,796 B2
(45) Date of Patent: Sep. 4, 2007

(54) TELEVISION TUNER IN WHICH POWER IS SUPPLIED TO EXTERNAL CIRCUIT CONNECTED TO CONNECTOR

(75) Inventor: Masaki Yamamoto, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 571 days.

(21) Appl. No.: 10/924,229

(22) Filed: Aug. 23, 2004

(65) Prior Publication Data

US 2005/0057695 A1    Mar. 17, 2005

(30) Foreign Application Priority Data

Aug. 25, 2003  (JP)  ............................ 2003-270729 U

(51) Int. Cl.
  *H04N 5/63* (2006.01)
  *H04N 5/50* (2006.01)
(52) U.S. Cl. ........................................ 348/730; 348/731
(58) Field of Classification Search ................ 348/730, 348/731–733, 725–728; 455/300, 301, 190.1, 455/191.1, 192.3; 334/64, 85; *H04N 5/50, H04N 5/63*
See application file for complete search history.

(56) References Cited

U.S. PATENT DOCUMENTS 6,765,626 B1 *  7/2004  Tanaka ......................... 348/725
7,030,939 B2 *  4/2006  Yamamoto ................... 348/731
7,129,994 B2 * 10/2006  Sasaki et al. ................ 348/731
2003/0202126 A1 * 10/2003  Sasaki ........................ 348/731

FOREIGN PATENT DOCUMENTS

JP    H06-028866    8/1994

* cited by examiner

*Primary Examiner*—Sherrie Hsia
(74) *Attorney, Agent, or Firm*—Brinks Hofer Gilson & Lione

(57) ABSTRACT

A television tuner comprises a connector 2 to which a television signal is input, a high frequency circuit 5 for frequency-converting the television signal into an intermediate frequency signal and outputting the intermediate frequency signal, and a power supply terminal 10 for supplying a power supply voltage to the high frequency circuit. And a power switch circuit 12 for supplying the power supply voltage to the connector is provided between the connector and the power supply terminal. Accordingly, by turning on/off the power switch circuit, the power supply voltage is supplied to the external circuit connected to the connector, and, when the power supply is stopped, the semiconductor device can be prevented from being damaged due to application of the over-voltage from the exterior to the connector.

5 Claims, 1 Drawing Sheet

TELEVISION TUNER IN WHICH POWER IS SUPPLIED TO EXTERNAL CIRCUIT CONNECTED TO CONNECTOR

This application claims the benefit of priority to Japanese Patent Application No. 2003-270729, herein incorporated by reference.

BACKGROUND OF THE INVENTION

1. Field of the Invention

The present invention relates to a television tuner in which power is supplied to an external circuit connected to, for example, a connector to which a television signal is input.

2. Description of the Related Art

FIG. 2 shows a satellite broadcast receiver for supplying power to a converter connected to an input terminal. The converter 22 converts a signal of 12 GHz received by an antenna 21 into an IF signal of 1 GHz so as to supply it to an IF input terminal 25 of a BS tuner 4 via a coaxial cable 23. The supplied IF signal is supplied to a frequency converting circuit 26 through a capacitor C to be converted into an intermediate frequency signal. The output signal of the frequency converting circuit 26 is supplied to an AGC circuit 27.

The output signal of the AGC circuit 27 is supplied to an FM demodulating circuit 28 to be FM-demodulated, thereby obtaining a video signal with an attached spread signal and 4-phase DPSK audio sub-carrier. The FM-demodulated video signal of the FM demodulating circuit 28 is supplied to a video signal processing circuit 29, and a video output signal is extracted by a de-emphasis circuit for returning a pre-emphasis video signal to its original waveform, an energy spread signal removing circuit and a video amplifying circuit to be supplied to a video signal output terminal 30.

The 4-phase DPSK audio sub-carrier is supplied to an audio processing circuit 31, wherein a 2-channel audio output signal is extracted by a 4-phase DPSK demodulator circuit for obtaining a PCM signal by demodulation and a PCM demodulator circuit for extracting the audio signal from digital signal by demodulating the PCM signal, to be supplied to the audio signal output terminals 32 and 33.

In addition, the converter 22 reduces the effect of HUM modulation since it deals with a weak signal, and, in order to reduce the size and the weight of a case body, the operation power is supplied from a BS tuner 24. The DC power supply voltage (15V) made in the power supply circuit 34 for the converter is supplied to the IF input terminal 25 via inductance L for blocking the high frequency component, and is sent to the converter 22 through the coaxial cable 23 (For example, refer to Japanese examined Patent Publication No. 06-028866(page 2, FIG. 2)

In the conventional construction, since the voltage from the power supply circuit 34 for the converter is supplied to the IF input terminal 5 via only the inductance L, there is a problem in that, when an over-voltage is applied to the IF input terminal 25 from the outside, the applied voltage is not reduced and is applied to the power supply circuit 34 of the converter to damage the semiconductor device provided therein. Also, since the power supply circuit 34 for the converter is connected to the power supply voltage supplied to the BS tuner 24, the semiconductor device used in each circuit within the frequency converting circuit 26 may be damaged by the power. Further, since the DC voltage is always output to the IF input terminal 25, a jig for performing DC-insulation by a capacitive means must be provided between the measuring instrument and the IF input terminal 25, in order to protect the measuring instrument connected to the IF input terminal 25 during manufacture and inspection of the BS tuner 24. Accordingly, the operation becomes complex. In addition, when the jig is used, the high frequency characteristics are changed, and thus it is impossible to perform accurate measurement.

SUMMARY OF THE INVENTION

An object of the present invention is to provide a television tuner, in which the power supply voltage is applied to a connector to which a television signal is input and the circuit element therein is not damaged due to application of an over-voltage from the exterior to the connector.

In order to solve the above-mentioned problems, the present invention provides a television tuner comprising a connector to which a television signal is input, a high frequency circuit for frequency-converting the television signal into an intermediate frequency signal and outputting the intermediate frequency signal, and a power supply terminal for supplying a power supply voltage to the high frequency circuit, in which a power switch circuit for supplying the power supply voltage to the connector is provided between the connector and the power supply terminal.

In addition, a feeding resistor is serially inserted between the connector and the power switch circuit.

Moreover, an inductance element is inserted between the connector and the feeding resistor, and both ends of the resistor are high-frequency-grounded.

Further, the power switch circuit has a transistor of which the emitter is connected to the power supply terminal and the collector is connected to the feeding resistor, and a switching terminal connected to the base of the transistor for applying a switching voltage from the exterior is provided such that the transistor is turned on/off by the switching voltage.

Also, the high frequency circuit has an integrated circuit comprised of a mixer for converting the frequency and an intermediate frequency amplifier for amplifying the intermediate frequency signal, and the integrated circuit is provided with a switch unit for switching the voltage of the base of the transistor to high or low level.

In the present invention, since the television tuner comprises a connector to which a television signal is input, a high frequency circuit for frequency-converting the television signal into an intermediate frequency signal and outputting the intermediate frequency signal, and a power supply terminal for supplying a power supply voltage to the high frequency circuit, and a power switch circuit for supplying the power supply voltage to the connector is provided between the connector and the power supply terminal, the power supply voltage can be supplied to the external circuit connected to the connector, and, when the television tuner is inspected, the semiconductor device can be prevented from being damaged due to application of the over-voltage from the exterior to the connector, by stopping the power supply.

In addition, since a feeding resistor is serially inserted between the connector and the power switch circuit, the semiconductor device in the power switch circuit or the high frequency circuit can be prevented from being damaged due to the application of the over-voltage, even in case of supplying the power supply voltage to the connector.

Moreover, since an inductance element is inserted between the connector and the feeding resistor, and both ends of the resistor are high-frequency-grounded, the rapid voltage change upon applying the over-voltage is reduced, thereby accomplishing the protection.

Further, since the power switch circuit has a transistor of which the emitter is connected to the power supply terminal and the collector is connected to the feeding resistor, and a switching terminal connected to the base of the transistor for applying a switching voltage from the exterior is provided such that the transistor is turned on/off by the switching voltage, the power switch circuit can be protected by turning off the transistor from the jig for measurement, when the television tuner is inspected.

Also, since the high frequency circuit has an integrated circuit comprised of a mixer for converting the frequency and an intermediate frequency amplifier for amplifying the intermediate frequency signal, and the integrated circuit is provided with a switch unit for switching the voltage of the base of the transistor to a high or low level, in case the television tuner is used, it can be set to supply the power supply voltage to the connector.

DESCRIPTION OF THE PREFERRED EMBODIMENT

Hereinafter, embodiments of the present invention will now be described with reference to the drawings.

Figure 1:
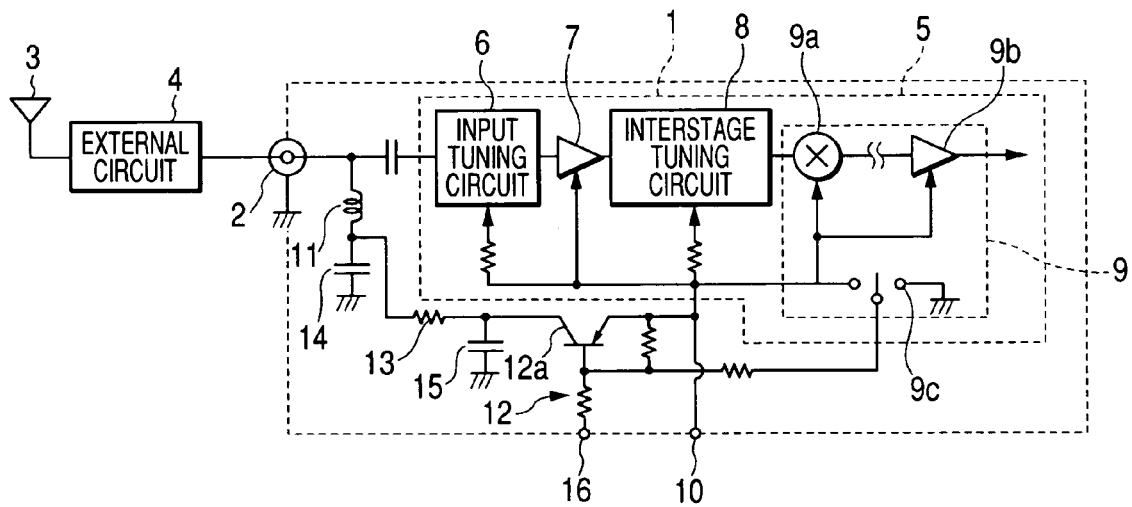
FIG. 1 is a circuit diagram showing the construction of a television tuner according to the present invention.
Figure 2:
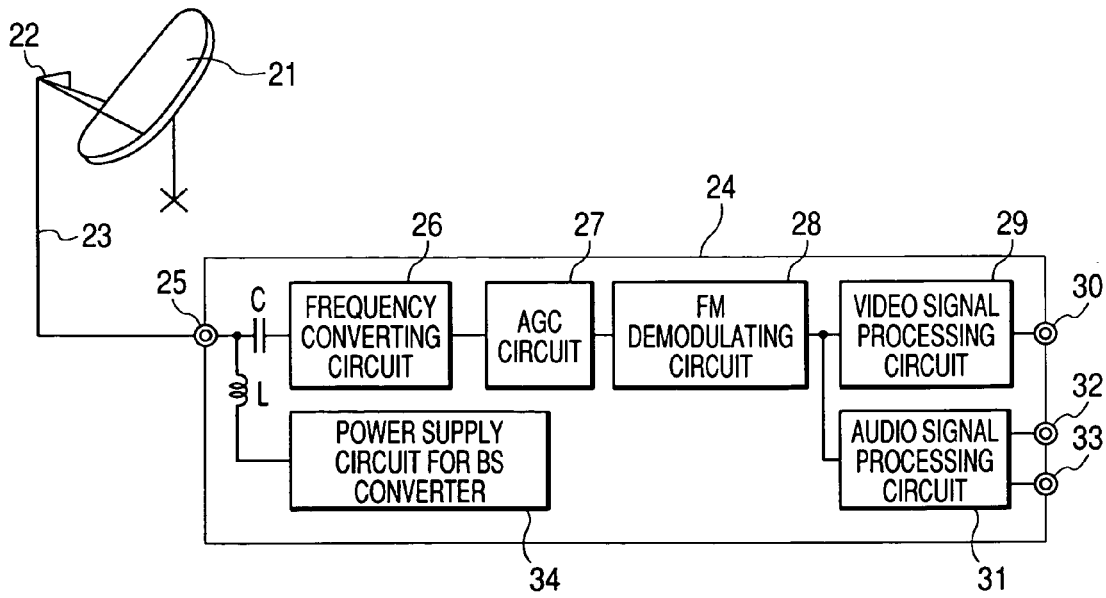
FIG. 2 is a circuit diagram showing the construction of a conventional television tuner.

FIG. 1 shows the construction of a television tuner of the present invention. A connector 2 to which a television signal is input, is attached to the television tuner 1. Generally, an antenna 3 is connected to the connector 2. But, as illustrated in Figure, when the electric field of the received signal is weak, an external circuit 4 such as a booster is connected to the connector and the antenna 3 is connected to the external circuit 4. Also, the television signal amplified by the external circuit 4 is input to the connector 2.

The connector 2 is coupled with a high frequency circuit 5 for converting the television signal into an intermediate frequency signal. The high frequency circuit 5 comprises an input tuning circuit 6, a high frequency amplifier 7, an interstage tuning circuit 8, and integrated circuit 9 comprised of a mixer 9a or an intermediate frequency amplifier 9b, an oscillator (not shown) and so on. In addition, the television signal selected by the input tuning circuit 6 and the interstage tuning circuit 8 and amplified by the high frequency amplifier 7 is input to the mixer 9a. The mixer 9a is supplied with a local oscillating signal from the oscillator, and the input television signal is converted into the intermediate frequency signal. The intermediate frequency signal is supplied to the intermediate frequency amplifier 9b through the intermediate frequency tuning circuit (not shown). Also, the television tuner 1 is provided with a power supply terminal 10, and the power supply voltage supplied hereto is supplied to each of the circuits in the high frequency circuit 5.

On the other hand, the connector 2 is connected with an inductance element 11 which is DC-isolated from ground at one end and is high-frequency-grounded. Thereby, when a shock wave including an alternative current component having low frequency, such as inductive lightning, is applied, it is bypassed to protect the high frequency circuit 5.

In addition, the television tuner 1 is provided with a power switch circuit 12 for supplying the power supply voltage to the connector 2. The power switch circuit 12 has a PNP-type transistor 12a, of which the emitter is connected to the power supply terminal 10 and the collector is connected one end of the inductance element 11 via a feeding resistor 13. In addition, both ends of the feeding resistor 13 are connected to the ground by capacitive elements 14 and 15 for high-frequency-ground. The television tuner 1 is provided with a switching terminal 16 to which the switching voltage is applied from the exterior, and the base of the transistor 12a is connected to the switching terminal 16.

Furthermore, the integrated circuit 9 comprises a switch unit 9c composed of a switch transistor. The switch unit 9c generates a high or low voltage by a control signal supplied to the television tuner 1 and applies it to the base of the transistor 12a.

By the above-mentioned construction, the transistor 12a of the power switch circuit 12 is turned on by applying the low voltage from the exterior to the switching terminal 16 or by outputting a low voltage from the switch unit 9c in the integrated circuit 9, and thus the power supply voltage is supplied from the power switch circuit 12 to the connector 2. Also, the transistor 12 is turned off by application of a high voltage, and the power supply to the connector 2 is stopped.

Accordingly, in inspecting the television tuner 1, if the measuring jig (not shown) is set to the television tuner 1 to apply the switching voltage from the measuring jig to the switching terminal 16 to turn off the transistor 12a, the connector 2 is not supplied with a power supply voltage. Though the connector 2 is supplied with a high voltage, the semiconductor device in the power switch circuit 12 or the high frequency circuit 5 is not damaged. Also, when the inspection is finished, the power supply voltage can be supplied to the connector 2 by turning on the transistor 12a by the switch unit 9c.

In addition, in case an undesirable high voltage is applied to the connector 2 from the exterior while supplying the power supply voltage to the connector 2, the voltage is reduced by the inductance element 11 and the capacitive elements 14 and 15 in the applied instant, and then the voltage applied to the transistor 12a is reduced by the feeding resistor 13. Accordingly, the semiconductor device in the high frequency circuit 5 as well as the transistor 12a is protected and is not damaged.

What is claimed is:

1. A television tuner, comprising:
   a connector to which a television signal is input;
   a high frequency circuit for frequency-converting the television signal into an intermediate frequency signal and outputting the intermediate frequency signal; and
   a power supply terminal for supplying a power supply voltage to the high frequency circuit,
   wherein a power switch circuit for supplying the power supply voltage to the connector is provided between the connector and the power supply terminal.

2. The television tuner according to claim 1, wherein a feeding resistor is serially inserted between the connector and the power switch circuit.

3. The television tuner according to claim 2, wherein an inductance element is inserted between the connector and the feeding resistor, and both ends of the resistor are high-frequency-grounded.

4. The television tuner according to claim 2, wherein the power switch circuit has a transistor of which an emitter is connected to the power supply terminal and a collector is connected to the feeding resistor, and a switching terminal connected to a base of the transistor for applying a switching voltage from the exterior is provided such that the transistor is turned on/off by the switching voltage.

5. The television tuner according to claim 4, wherein the high frequency circuit comprises an integrated circuit comprised of a mixer for converting the frequency and an intermediate frequency amplifier for amplifying the intermediate frequency signal, and the integrated circuit comprises a switch unit for switching the voltage of the base of transistor to a high or low level.

* * * * *

UNITED STATES PATENT AND TRADEMARK OFFICE
CERTIFICATE OF CORRECTION

| | |
|---|---|
| PATENT NO. | : 7,265,796 B2 |
| APPLICATION NO. | : 10/924229 |
| DATED | : September 4, 2007 |
| INVENTOR(S) | : Masaki Yamamoto |

It is certified that error appears in the above-identified patent and that said Letters Patent is hereby corrected as shown below:

<u>In the Claims</u>

Column 6, in claim 5, line 3, after "a switch unit for switching" delete "the" and substitute --a-- in its place.

Signed and Sealed this

Eleventh Day of December, 2007

JON W. DUDAS
*Director of the United States Patent and Trademark Office*